May 27, 1969 V. R. CARR 3,445,972
PANEL ASSEMBLY
Filed Aug. 26, 1966 Sheet 1 of 2
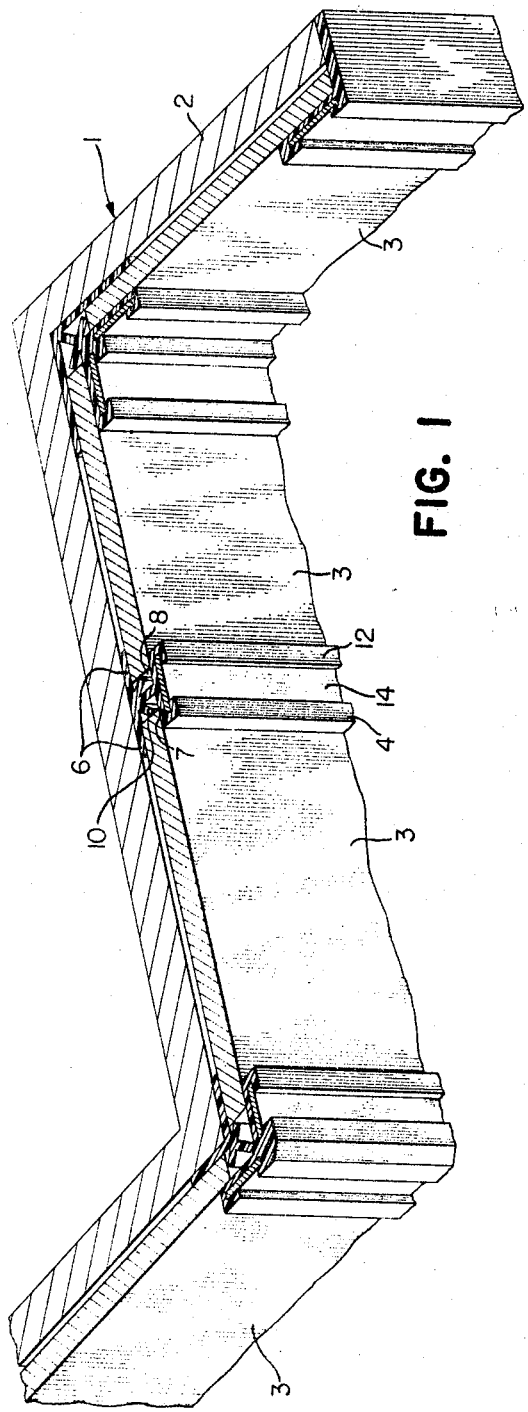
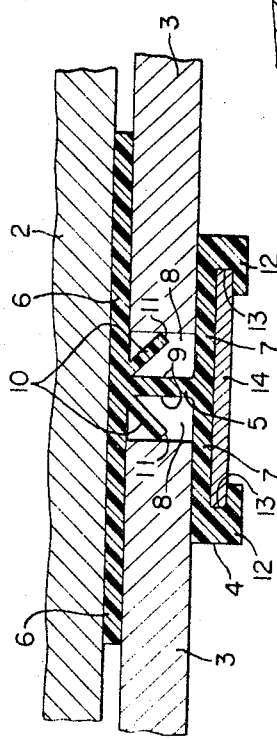
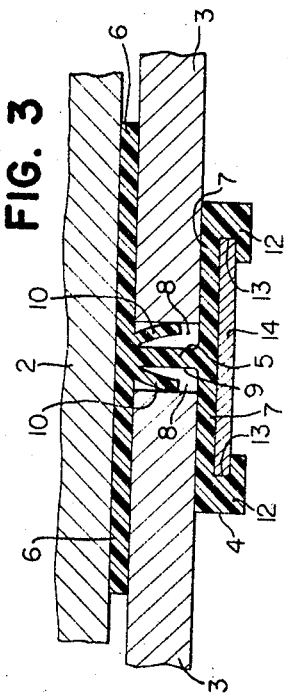
INVENTOR.
VERNON R. CARR
BY
*A. Milliken*
ATTORNEY

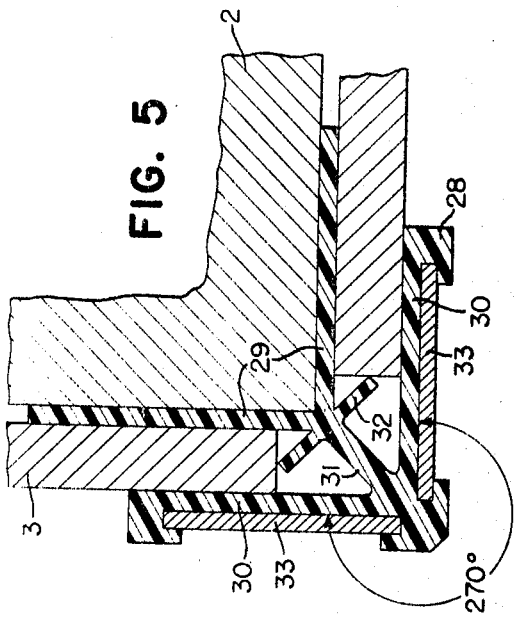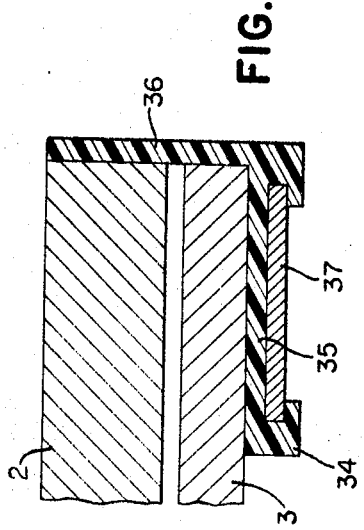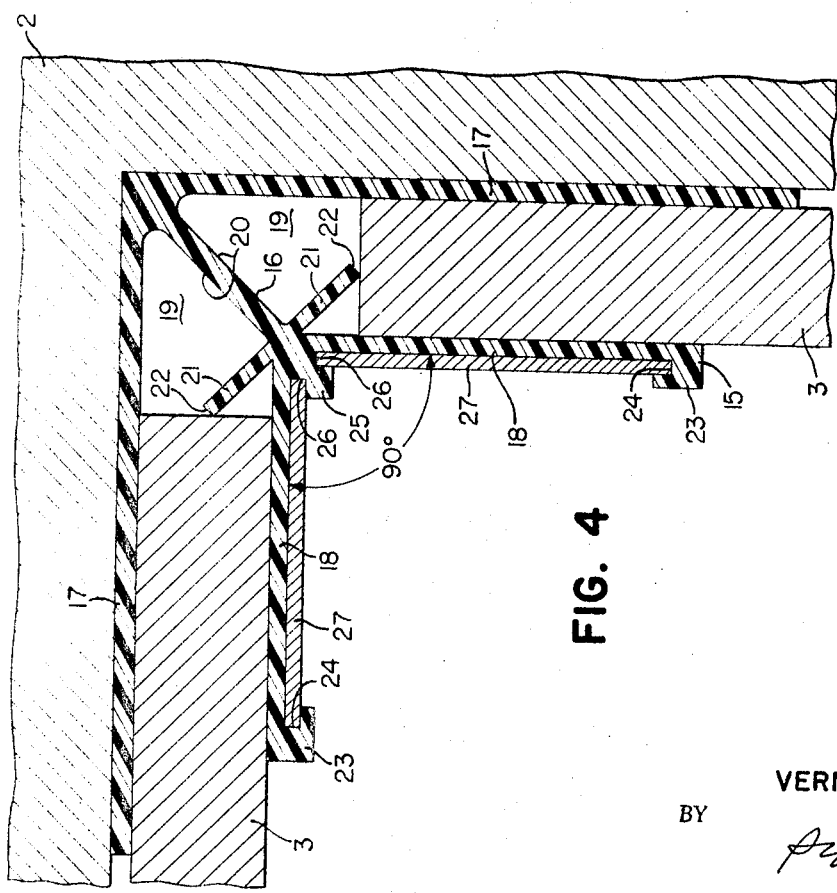

United States Patent Office

3,445,972
Patented May 27, 1969

3,445,972
PANEL ASSEMBLY
Vernon R. Carr, Akron, Ohio, assignor to The Goodyear Tire & Rubber Company, Akron, Ohio, a corporation of Ohio
Filed Aug. 26, 1966, Ser. No. 575,935
Int. Cl. E04b 1/68, 1/92
U.S. Cl. 52—98    4 Claims

ABSTRACT OF THE DISCLOSURE

A panel assembly connected together by elongated extruded moldings having opposed channels for receiving the marginal edges of panels. Each channel has a resilient expansion web, integral with the molding, which engages the edge of a panel placed therein and spaces it in such manner within the channel that upon expansion of the panel, the expansion web will bend or break to permit the panel edge to move farther into the channel and prevent buckling of the panel.

---

Expansion joints of many types are known in the prior art. A typical expansion joint used to support adjacent sections of wall boards, partition boards and the like is shown in Patent No. 1,774,121 issued to Luloff Wilson. This patent discloses a joint made of folded metal in which a number of individual tongues are punched out of a center web portion in the joint and protrude on either side of the web to hold the panel edges in spaced relation from each other. The tongues are sufficiently resilient, however, to bend inwardly and permit expansion of the panels due to heat or moisture absorption. Another typical expansion joint is illustrated in Patent No. 2,796,624 issued to H. E. Speer. The Speer patent shows a plastic extrusion of substantially H-shaped cross section for joining two sections of flooring.

The primary object of the present invention is to provide a molding for joining panels together in an assembly in which the adjacent edges of adjoining panels are positioned in spaced relationship to each other during assembly to permit subsequent lateral expansion of the panels without buckling thereof.

Another object of the invention is to provide a panel assembly in which the panels are joined together by a unitary molding which is simple, inexpensive to manufacture and easy to assemble and disassemble when erecting or removing the panels.

A still further object of the invention is to provide a molding which serves as a decorative trim strip between the joints of adjacent panels in a panel assembly.

These and other objects of the invention will become apparent in the following specification and claims and in the annexed drawings in which:

FIG. 1 shows a fragmentary perspective view of a typical panel assembly with portions of the structure broken away to show the various molding configurations of the invention;

FIG. 2 shows a cross-sectional view of a molding joining two adjacent panels lying in the same plane;

FIG. 3 is a cross-sectional view similar to FIG. 2 but showing the panels in an expanded position;

FIG. 4 is a cross-sectional view of an inside corner molding joining two adjacent panels which are perpendicular to each other;

FIG. 5 is a cross-sectional view of an outside corner molding joining two panels which are perpendicular to each other; and FIG. 6 is a cross-sectional view of an edge molding used to cover the edge of a panel and a supporting wall structure on which the panel is mounted.

Referring now to the drawings and in particular to FIG. 1, the numeral 1 indicates generally a panel assembly mounted on a supporting structure 2 such as an existing wall or an open framework of studs or similar members. The panel assembly of this invention is preferably used for mounting wall panels on walls or partitions of a building or similar structure, but may also be used for ceiling panels and other situations where it is necessary to join panels in edge to edge relationship. For the purpose of illustrating the invention, the assembly will be shown as a wall structure in which the moldings which connect the panels together are vertical members. In assembling the structure, a plurality of panels 3 are attached to the supporting structure 2 by adhesive, nails or any other suitable means. The panels 3 are mounted vertically upon the supporting structure 2 with the adjacent edges of each adjoining panel in spaced relationship from each other. As shown in FIG. 1, when two or more of the panels 3 lying in the same plane are to be joined togther, a molding 4 perferably a plastic extrusion of substantially H-shaped cross section is used. The molding may be made of other suitable materials and by other manufacturing techniques so long as it has the required physical properties which will be described later. The molding 4 shown in enlarged cross section in FIG. 2 has two pairs of flanges extending from opposite sides of a center web 5. Each pair of flanges includes an inner flange 6 and an outer flange 7. Each pair of flanges 6 and 7 are parallel to each other and define therebetween a channel 8 for receiving a marginal edge of one of the panels 3. Each opposite side of the web 5 forms a bottom 9 of one of the channels 8. In each channel 8 is an expansion web 10 extending outwardly from the juncture of the inside face of the inner flange 6 and the bottom 9 of the channel 8 at an inclined angle to the flanges 6 and 7 so that the outer edge 11 of the web 10 is spaced from the bottom to position a marginal edge of the panel 3 in spaced relation to the bottom 9 of the channel 8. It may be seen that both pairs of flanges 6 and 7 and the channels 8 formed therebetween are identical to each other and merely face in opposite directions to receive two opposed edges of adjoining panels 3. Both inner flanges 6 form a continuous flat outer surface to engage the supporting structure 2 when installed.

As shown, each of the outer flanges 7 has a rib 12 along the outer edge with an inwardly facing groove 13 in each rib 12. The grooves 13 provide a means for retaining a decorative trim strip 14 on the outside face of the molding 4. The trim strip 14 can be inserted in position by sliding it into the grooves 13 from the end of the molding 12 or if it is sufficiently flexible, it can be bowed slightly and snapped into position.

In FIG. 3, the molding 4 is shown with a panel 3 inserted in each of the channels 8 but with the panels 3 in an expanded position. The expansion of the panels 3 forces each of the expansion webs 10 inwardly in the channel toward the bottom thereof. The webs 10 are sufficiently flexible to permit a certain amount of expansion and contraction of the panels 3 without breaking of the web 10. If the panels 3 expand a sufficient amount to break the webs 10, the usefulness of the molding 1 will not be impaired because the flanges 6 and 7 are of sufficient length to cover the edge of the panels 3 even if the panels return to a contracted position. The most important function of the webs 10 is to provide initially the sufficient spacing between two of the adjacent panels 3 to allow any expansion which may later occur without buckling of the panels. Once the webs 10 have served this purpose, it does not impair the usefulness of the molding for the webs to break off at a later time.

The molding 4 shown in FIGS. 1, 2 and 3 illustrate the basic principles of this invention and the manner in which the expansion webs 10 position the edges of the panels 3 to permit later expansion and contraction of the panels. The moldings 4 are used, of course, when joining a series of panels in a common plane along a straight section of wall. When it becomes necessary, however, to join two adjacent panels either at an inside or an outside corner, a different molding configuration is necessary to accommodate such arrangement, although the principle of the expansion web 10 and its operation remains the same.

In FIGS. 1 and 4, an inside corner molding 15 is shown. The molding 15 is similar to the molding 4 except that it is designed to join two adjacent panels at right angles to each other.

The molding 15 has two pairs of flanges extending from opposite sides of a center web 16 at approximately a 45° angle thereto. Each pair of flanges includes an inner flange 17 and an outer flange 18. Each pair of flanges 17 and 18 are parallel to each other but are perpendicular to the opposite pair of flanges. Each pair of flanges 17 and 18 define therebetween a channel 19 for receiving a marginal edge of one of the panels and the opposite pair of flanges 17 and 18 defines an opposite channel 19 at right angles thereto. Each opposite side of the web 16 forms a bottom 20 of one of the channels 19. Located in each of the channels 19, is an expansion web 21 extending outwardly from the juncture of the inside face of the outer flange 18 and the bottom 20 of the channel 19 at an inclined angle to the flanges 17 and 18 so that the outer edge 22 of the web 21 is spaced from the bottom to position a marginal edge of the panel 3 in spaced relation to the bottom of the channel 19. It may be seen that both pairs of flanges 17 and 18 and the channels 19 formed therebetween are identical to each other but face outwardly from the center web 16 at right angles to each other to receive two opposed edges of adjoining panels 3. Both the inner flanges 17 form a continuous L-shaped member, the outside face of which lies against an inside corner of the supporting structure 2. Each of the outer flanges 18 has a rib 23 along the outer edge with an inwardly facing groove 24 therein. An integral rib 25 is located at the juncture of the outside faces of the two outer flanges 18. The rib 25 has two longitudinal grooves therein each of which faces one of the grooves 24 in one of the ribs 23. The grooves 24 and 26 provide a means for retaining a decorative trim strip 27 on each of the exposed faces of the inside corner molding 15. The trim strip 27 can be inserted in the same manner as strip 14 in the molding 4. The expansion of the panels 3 forces each of the expansion webs 21 inwardly in the channel 19 toward the bottom thereof in the same manner as the webs 10 shown in FIG. 3.

An outside corner molding 28 is shown in FIG. 5 which is similar to the inside corner molding 15 in FIG. 4 except that the 90° angle formed by the molding 15 faces away from the supporting structure 2 and the 90° angle formed by the molding 28 faces toward the supporting structure 2.

The molding 28 has two inner flanges 29 similar to the inner flanges 17 in the molding 15 and two outer flanges 30 similar to outer flanges 18. Each pair of flanges 29 and 30 extends outwardly from the opposite sides of a center web 31 similar to center web 16. An expansion web 32 similar to the web 21 in molding 18 extends outwardly from the juncture of the inside face of each inner flange 29 and the center web 31. The expansion web 32 functions in the same manner as previously described in the other molding configurations and therefore will not be described in further detail. Since the 90° angle formed by the molding 28 faces toward the supporting structure 2, this results in a 270° angle being formed between the outside faces of the two outside flanges 30. A trim strip 33 similar to trim strip 27 may be used with each outer flange 30 in the same manner that the trim strip 27 is used with the outer flanges 18.

In FIG. 6, an L-shaped edge molding 34 is used to cover the edge of a panel 3 and the edge of the supporting structure 2. Such a molding configuration is useful at the end of a wall or at a doorway or similar opening. The molding 34 has an outer facing leg 35 the inner surface of which lies against the outside face of the panel 3 and an edge covering leg 36 perpendicular to the leg 35 and covering the edge of the panel 3 and the supporting structure 2. The molding 34 also has a trim strip 37 which is mounted in the same manner as trim strip 14 on the mounting 4.

Although the preferred embodiment of the various moldings described in this application contemplates the use of a plastic extrusion, it will be understood that other materials may be used so long as the expansion web is sufficiently yieldable to either bend or break off upon expansion of the panels contacting the web. It will also be understood that the expansion web may vary somewhat in the manner in which it is positioned adjacent the bottom of the panel receiving channels so long as its position will properly space the panels from the bottom of the channel during assembly of the paneling but will not prevent expansion of the panels into the channel.

Various changes can be made in the illustrative embodiments shown herein without departing from the scope of the invention.

What I claim is:

1. A panel assembly for mounting on a supporting structure comprising:
   (A) a plurality of panels mounted on the supporting structure in edge to edge alignment with the marginal edges of each panel spaced from the adjacent marginal edges of the adjoining panels,
   (B) an elongated molding of uniform cross section throughout its length positioned between the adjacent edges of each adjoining panel, said molding having
      (a) a longitudinally extending center web
      (b) at least two pairs of flanges extending from opposite sides of the center web with each pair of flanges including an inner flange and an outer flange defining a channel therebetween for receiving a marginal edge of one of the panels being joined together, each side of said center web forming the bottom of one of the channels, and
      (c) an integral expansion web extending longitudinally of each channel and inclined outwardly of the channel toward the open edge thereof at an angle with respect to the sides thereof with a portion of said web spaced from the bottom of said channel to engage a panel edge inserted therein to position said edge in predetermined spaced relation to the bottom of said channel during assembly of the panels, the web being yieldable to permit the panel edge to move toward the bottom of the channel when expansion of the panels occurs, thereby preventing buckling of the panel.

2. A panel assembly as claimed in claim 1 wherein the expansion web is frangible and will break off upon sufficient pressure by the panel edge to permit expansion of the panel into the channel.

3. A molding for joining together panels in edge to edge relationship comprising a unitary elongated body of uniform cross section throughout its length said body having:
   (A) a longitudinally extending center web
   (B) at least two pairs of flanges extending from opposite sides of the center web with each pair of flanges including an inner flange and an outer flange defining a channel therebetween for receiving a marginal edge of one of the panels being joined together, each side of said center web forming the bottom of one of the channels, and (C) an integral expansion web extending longitudinally of each channel and inclined outwardly of the channel toward the open edge thereof at an angle with respect to the sides thereof with a portion of said expansion web spaced from the bottom of said channel to engage a panel edge inserted therein to position said edge in predetermined spaced relation to the bottom of the channel during assembly of the panels, but being yieldable to permit the panel edge to move toward the bottom of the channel when expansion of the panels occurs thereby preventing buckling of the panel.

4. A molding as claimed in claim 3 wherein the expansion web is frangible and will break off upon sufficient pressure by the panel edge to permit expansion of the panel into the channel.

References Cited

UNITED STATES PATENTS

| 1,774,121 | 8/1930 | Wilson | 52—417 X |
| 2,796,624 | 6/1957 | Speer | 52—470 X |
| 3,304,679 | 2/1967 | Benkin | 52—312 |
| 3,363,390 | 1/1968 | Crane et al. | 52—627 X |

HENRY C. SUTHERLAND, *Primary Examiner.*

PRICE C. FAW, JR., *Assistant Examiner.*

U.S. Cl. X.R.

52—395, 470, 573